(12) United States Patent
Banerjee et al.

(10) Patent No.: US 9,486,987 B2
(45) Date of Patent: Nov. 8, 2016

(54) PARTIALLY OPAQUE-PARTIALLY CLEAR LAMINATES AND METHODS THEREOF

(75) Inventors: Tapan Kumar Banerjee, Mumbai (IN); Chandrashekhar Ramchandra Abhyankar, Mumbai (IN); Mrinal Kanti Banerjee, Mumbai (IN)

(73) Assignee: Essel Propack Ltd., Mumbai (IN)

( * ) Notice: Subject to any disclaimer, the term of this patent is extended or adjusted under 35 U.S.C. 154(b) by 189 days.

(21) Appl. No.: 14/125,531

(22) PCT Filed: Jun. 14, 2012

(86) PCT No.: PCT/IN2012/000421
§ 371 (c)(1),
(2), (4) Date: Dec. 11, 2013

(87) PCT Pub. No.: WO2013/072918
PCT Pub. Date: May 23, 2013

(65) Prior Publication Data
US 2014/0124130 A1    May 8, 2014

(30) Foreign Application Priority Data

Jun. 14, 2011 (IN) .......................... 1732/MUM/2011

(51) Int. Cl.
*B32B 27/32* (2006.01)
*B32B 3/10* (2006.01)
(Continued)

(52) U.S. Cl.
CPC ................ *B32B 27/32* (2013.01); *B32B 1/08* (2013.01); *B32B 3/10* (2013.01); *B32B 7/12* (2013.01); *B32B 27/08* (2013.01); *B32B 27/306* (2013.01); *B32B 27/327* (2013.01); *B32B 27/34* (2013.01); *B32B 27/36* (2013.01); *B32B 37/12* (2013.01); *B32B 37/153* (2013.01); *B32B 38/145* (2013.01); *B32B 2038/0092* (2013.01); *B32B 2250/24* (2013.01); *B32B 2255/10* (2013.01); *B32B 2255/205* (2013.01); *B32B 2255/26* (2013.01); *B32B 2307/40* (2013.01);
(Continued)

(58) Field of Classification Search
CPC ............... Y10T 428/24802; Y10T 428/24991
See application file for complete search history.

(56) References Cited

U.S. PATENT DOCUMENTS

| 5,443,915 A | 8/1995 | Wilkie et al. |
| 6,041,929 A | 3/2000 | Brunner et al. |

(Continued)

FOREIGN PATENT DOCUMENTS

| CN | 1703315 | 11/2005 | |
| FR | WO 9826930 A1 * | 6/1998 | ......... B29C 47/0021 |

(Continued)

OTHER PUBLICATIONS

Machine translation of JP3012000 acquired on Dec. 1, 2015.*

*Primary Examiner* — Gerard Higgins
(74) *Attorney, Agent, or Firm* — Baker & Hostetler LLP

(57) ABSTRACT

The present relates a laminate comprising: an outer polyethylene (PE) layer; a first adhesive layer; a substrate layer with one side selectively vacuum metalized or selectively reverse printed and said printed or metalized side is toward first adhesive layer; a second adhesive layer; an ethylene vinyl alcohol (EVOH) polymer barrier film layer; an linear density polyethylene (LDPE) extrusion layer; and an inner polyethylene (PE) layer. The present disclosure further relates to tubes made of the partially opaque and partially clear laminate. The present disclosure also relates to a process of manufacturing of tubes using the said laminate.

12 Claims, 2 Drawing Sheets

(51) Int. Cl.

| | | |
|---|---|---|
| *B32B 27/08* | (2006.01) | |
| *B32B 27/30* | (2006.01) | |
| *B32B 27/34* | (2006.01) | |
| *B32B 27/36* | (2006.01) | |
| *B32B 1/08* | (2006.01) | |
| *B32B 7/12* | (2006.01) | |
| B32B 37/15 | (2006.01) | |
| B32B 38/00 | (2006.01) | |
| B32B 37/12 | (2006.01) | |

(52) U.S. Cl.
CPC ..... *B32B 2307/41* (2013.01); *B32B 2307/412* (2013.01); *B32B 2307/7242* (2013.01); *B32B 2307/7244* (2013.01); *B32B 2307/7246* (2013.01); *B32B 2307/7265* (2013.01); *B32B 2439/40* (2013.01); *B32B 2597/00* (2013.01); *Y10T 428/24802* (2015.01); *Y10T 428/24868* (2015.01)

(56) References Cited

U.S. PATENT DOCUMENTS

| | | |
|---|---|---|
| 6,165,571 A | 12/2000 | Lykke |
| 6,916,516 B1 | 7/2005 | Gerber |
| 2002/0004112 A1 | 1/2002 | Muller et al. |
| 2004/0072004 A1 | 4/2004 | Migliorini et al. |
| 2004/0131868 A1 | 7/2004 | Watanabe et al. |
| 2005/0255268 A1 | 11/2005 | Burki et al. |
| 2006/0151993 A1 | 7/2006 | Nemeth |
| 2006/0172102 A1 | 8/2006 | Busch et al. |
| 2008/0286512 A1 | 11/2008 | Holzmuller et al. |
| 2009/0208717 A1 | 8/2009 | Enzinger et al. |
| 2010/0243094 A1 | 9/2010 | Arz |

FOREIGN PATENT DOCUMENTS

| | | |
|---|---|---|
| GB | 2338679 A | 12/1999 |
| JP | 3012000 | 2/2000 |
| WO | 9826930 | 6/1998 |
| WO | 2013046224 A2 | 4/2013 |
| WO | 2013051017 A2 | 4/2013 |

* cited by examiner

PARTIALLY OPAQUE-PARTIALLY CLEAR LAMINATES AND METHODS THEREOF

TECHNICAL FIELD

The present disclosure relates to a partially opaque and partially clear laminate; and a tube made of such laminate.

The present disclosure also relates to a process for manufacturing of such laminate tubes.

BACKGROUND

Gravure printing is a process known for quite some time. The basic concepts of gravure printing are known in ancient Italy and China. In China, it is said to have evolved from 100 AD, where printing plates were prepared by hand using engraving tools. In the 16$^{th}$ century with the invention of etching using chemicals, scratching of images as a resistant coating on the surface of metal printing plate was known. With the advent of photography in the late 19$^{th}$ century, the challenge of reproducing images that are near to real world posed the printing industry. This was when gravure was able to duplicate the photographic films by using gelatin, which hardened when exposed to light. The unhardened areas were washed away and etched using acid. These paved way for gravure printing techniques that are widely used today.

Gravure printing is vastly used in various industries including that of packaging. By using this technique many packaging products are made. Further, plastic tubes form an integral part of the packaging industry as they are used to enhance the shelf-life of packaged goods and create a unique product identity. Laminated Tubes are used for packaging in various sectors like oral care, food, cosmetics, pharmaceuticals, and also for other industrial applications. The oral care industry contributes to 70% of production of laminated tubes. The laminated tubes thus made are of two types, viz. Aluminium Barrier Laminates (ABL) tubes that have an aluminum foil barrier, which provides superior light, air and moisture barrier along with reduced flavor absorption. The material density offers a more durable tube and allows for additional dispensing of the products contents. Pastes, ointments, cream and gels typically dentifrice, over-the-counter and pharmaceutical products fare well in Aluminium Barrier Laminates (ABL) tube packaging. The second type of laminated tubes is Plastic Barrier Laminates (PBL) tubes that possess structures that are a good option for packaging with a need to maintain its form and shape. It presents a more cosmetic look and is environmental friendly. Special barriers can be provided such as Ethylene Vinyl Alcohol Polymer (EVOH), Nylon to offer a strong chemical resistance. Standard material is offered in white or natural (clear) but specialty custom colors can also be developed.

U.S. Pat. No. 6,041,929 discloses a film bag with hidden indicia formed in the film bag laminate, which is not viewed from outside the package. GB Patent 2,338,679 discloses a substrate for security documents such as banknotes, cheques, passports, etc. U.S. Pat. No. 5,443,915 discloses an oriented polyolefinic laminated film which has a core, a TiO2 containing white partially cold seal receptive polyolefinic skin layer on one side of the core, and a vacuum metalized surface on the other side of the core. US Patent application 2006/01519993 discloses a laminated security documents or tokens and process for manufacturing the same.

Plastic barrier layer (PBL) laminate tubes are also made of the polymers, but the barrier layer is made of a polymeric material, Ethyl Vinyl alcohol (EVOH) or Nylon. The Plastic barrier layer (PBL) laminated tubes are widely used in applications requiring attractive packaging such as for cosmetic products, good resilience (ability of tubes to return to their original shape after squeezing), and attractive visual and tactile effects. The Plastic barrier layer (PBL) laminated tubes are emerging as an alternative to aluminum foil based tubes.

The structure of the Plastic barrier layer (PBL) laminated tube known in the state-of-the-art comprises a polyethylene (PE) white layer as an outer layer. It has two layers of polyethylene (PE) encompassing a central layer of ethylene vinyl alcohol (EVOH), which acts as a barrier between the polyethylene (PE) layers. Finally it has an outer layer facing the product of polyethylene (PE). The laminates, which can be tailor-made, are either made transparent/clear or opaque or colored. Generally, the master batch consists of one form of laminates, i.e. transparent, opaque or colored.

SUMMARY

The present disclosure relates to a partially opaque and partially clear laminate. In an aspect of the present disclosure, it provides a partially opaque and partially clear laminate comprising an outer polyethylene (PE) layer; a first adhesive layer; a substrate layer with one side selectively vacuum metalized or selectively reverse printed and said printed or metalized side is toward first adhesive layer; a second adhesive layer; and ethylene vinyl alcohol (EVOH) polymer barrier film layer; a low density polyethylene (LDPE) extrusion layer; and an inner polyethylene (PE) layer. The present disclosure further relates to tubes made of the partially opaque and partially clear laminate.

The present disclosure also relates to a process of manufacturing the laminate tube from the partially opaque and partially clear laminate.

These and other features, aspects, and advantages of the present subject matter will be better understood with reference to the following description. This summary is provided to introduce a selection of concepts in a simplified form. This summary is not intended to identify key features or essential features of the disclosed subject matter, nor is it intended to be used to limit the scope of the disclosed subject matter.

BRIEF DESCRIPTION OF DRAWINGS

The above and other features, aspects, and advantages of the subject matter will be better understood with regard to the following description, appended claims, and accompanying drawings where:

DETAILED DESCRIPTION

Figure 1:
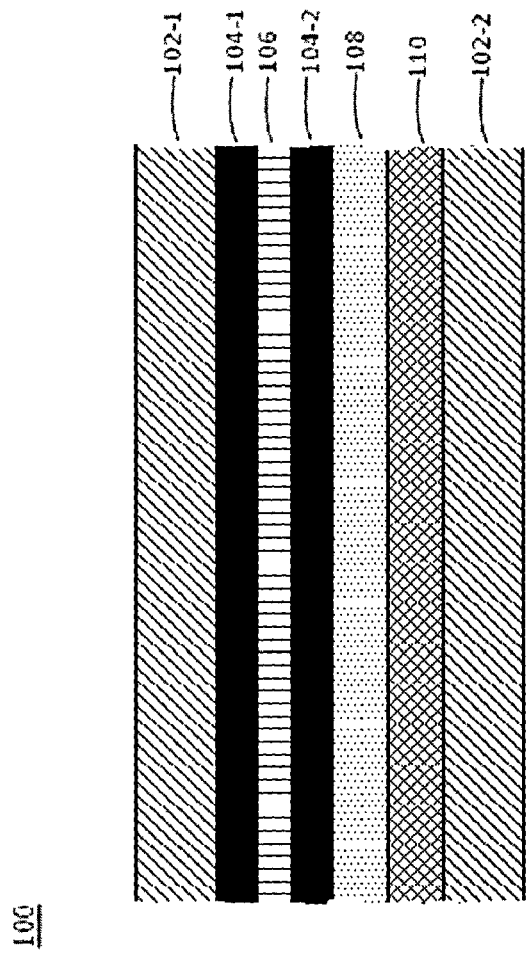
FIG. 1 illustrates a structure of a partially opaque and a partially clear laminate, according to an embodiment of the present subject matter.

The present disclosure provides a laminate which is partially opaque and partially clear and tubes formed thereof.

In one aspect, an embodiment of the present disclosure provides the partially opaque and partially clear laminate comprising: an outer polyethylene (PE) layer; a first adhesive layer; a substrate layer with one side selectively vacuum metalized or selectively reverse printed and said printed or metalized side is toward first adhesive layer; a second adhesive layer; an ethylene vinyl alcohol (EVOH) polymer barrier film layer; a low density polyethylene (LDPE) extrusion layer; and an inner polyethylene (PE) layer.

In an embodiment, the outer polyethylene (PE) layer of the partially opaque and partially clear laminate, is a three layer film comprising: 48.0%-48.5% metallocene linear low density polyethylene (LLDPE); 48.0%-48.5% linear density polyethylene (LDPE); and 3.0%-4.0% of a Clarifier in all the three layers. The layer ratio is 1:2:1 or 1:1:1 to give extra clear film. The clarifier can be any of the notably commercially available one such as "clariant", "Ambasad", "Millikon".

The outer polyethylene (PE) film layer can also be optionally printed by surface printing techniques. According an embodiment of the present disclosure provides a laminate wherein the outer polyethylene (PE) film layer is surface printed.

In another embodiment, the substrate layer on one side of which is selectively vacuum metalized or selectively reverse printed, can be selected from Polyethylene terepthalate polymer (PET), nylon, biaxially oriented film (BOPP) or Polyethylene (PE). The substrate layer is reverse printed or can be selectively printed, i.e. wherever, the laminate has to be opaque, can be printed. The remaining portion of the laminate is left clear. The laminate tubes made of such laminate in accordance with the present disclosure can be used for a variety of applications, requiring in aesthetic values, for packaging such as for cosmetic products, good resilience (ability of tubes to return to their original shape after squeezing), and attractive visual and tactile effects.

In an aspect of the present disclosure, the laminate can be printed opaque half way by reverse printing and left clear for the other half, such that, selectively opaque parts in the laminate can be obtained, which are alternate opaque and alternate clear. This can be both horizontal and vertical depending upon the customer needs. The reverse printing technique used in the present disclosure is Gravure printing. Generally, reverse printing is generally used when the decoration of the product is viewed through the carrier layer. To protect the decoration, for example against wear and tear it is performed to use reverse printing method.

In a gravure printing process, the image is printed on the reverse or the inner side of the outer substrate i.e. the print layer. Gravure is a big cylinder, which is used in flexible packaging of materials. It is made by engraving or etching on a steel or copper base in a preferred embodiment. In this technology, the gravure cylinder is configured in such a way that it can be selectively printed. Though, it is possible to print only on the surface of the laminate, such that a particular patch of the laminate can be color printed or white effect printed, it is still desirable to have selectively opaque parts in the laminate by using gravure printing.

In another aspect, the partially opaque and partially clear laminate comprising of a substrate layer, selected from Polyethylene terephthalate (PET), nylon, biaxially oriented film (BOPP), or Polyethylene (PE) wherein one side of said substrate layer is reverse printed by gravure reverse printing process, or metallized by vacuum metallization. The printed or metallized substrate is then placed between two adhesive layers. The printed or the metallized side is laminated with a clear Polyethylene (PE) film, which can be further surface printed. The non-printed or non-metallized side of the substrate layer is then laminated with an ethylene vinyl alcohol (EVOH) polymer based barrier film. The ethylene vinyl alcohol (EVOH) polymer based film is in contact with a Low density polyethylene (LDPE) extrusion layer. The low density polyethylene (LDPE) layer is followed by a polyethylene (PE) film layer that acts as a sealant layer. Thus a partially opaque and partially clear laminate is formed, which is further slitted to required length of tubes.

The first adhesive layer and the second adhesive layer in accordance with the present invention may be same or different. In one aspect, the first adhesive layer and the second primer layer are same. In another aspect, the adhesive layers independently, can be selected from any of the high performance adhesives from Henkel like Liofol UR 2790/UR5026-21 or Liofol 3644/Hardner 6055 or any other high performance adhesive which can give good bond against aggressive product formulations. The adhesive layer when present in the laminate of the present disclosure can be of thickness ranging from 5μ to 7μ.

In yet another embodiment, the ethylene vinyl alcohol (EVOH) polymer film layer is a five or a seven layered film layer. In accordance with the present disclosure, the ethylene vinyl alcohol (EVOH) film layer comprises a core ethylene vinyl alcohol (EVOH) polymer layer between two adhesive layers, further sandwiched by polyethylene (PE) layers.

In an aspect, the five-layered ethylene vinyl alcohol (EVOH) layer comprising: a polyethylene layer of linear low density polyethylene (LLDPE) and low density polyethylene (LDPE) having a thickness in the range of 15μ-30μ; a first tie layer having a thickness in the range of 8μ-20μ; an ethylene vinyl alcohol (EVOH) polymer layer having a thickness in the range of 5μ-25μ; a second tie layer having a thickness in the range of 8μ-20μ; and a polyethylene layer of linear low density polyethylene (LLDPE) and low density polyethylene (LDPE) having a thickness in the range of 10μ-30μ.

In an preferred embodiment, the five-layered ethylene vinyl alcohol (EVOH) layer comprises: a polyethylene layer of linear low density polyethylene (LLDPE) and low density polyethylene (LDPE) having a combined thickness of 20μ; a first tie layer having a thickness of 12μ; an ethylene vinyl alcohol (EVOH) polymer layer having a thickness of 15μ; a second tie layer having a thickness of 12μ; and a polyethylene layer of linear low density polyethylene (LLDPE) and low density polyethylene (LDPE) having a combined thickness of 20μ.

The structure of the above five layered structure is depicted as:

20μ ((Linear low density polyethylene (LLDPE)+Low density polyethylene (LDPE))//12μ First Tie layer//15μ, Ethylene vinyl alcohol (EVOH)//12μ Second Tie layer//20μ (Linear low density polyethylene (LLDPE)+Low density polyethylene (LDPE)).

In an aspect, the seven-layered ethylene vinyl alcohol (EVOH) layer comprising: a polyethylene layer of linear low density polyethylene (LLDPE) and low density polyethylene (LDPE) having a thickness in the range of 15μ-30μ; a first tie layer having a thickness in the range of 8μ-20μ; a first ethylene vinyl alcohol (EVOH) polymer layer having a thickness in the range of 4μ-6μ; a nylon 6 layer having a thickness in the range of 4μ-6μ; a second ethylene vinyl alcohol (EVOH) polymer layer having a thickness in the range of 4μ-6μ; a second tie layer having a thickness in the range of 8μ-20μ; and a polyethylene layer of linear low density polyethylene (LLDPE) and low density polyethylene (LDPE) having a thickness in the range of 10μ-30μ.

In an preferred embodiment, the seven-layered ethylene vinyl alcohol (EVOH) layer comprises: a polyethylene layer of linear low density polyethylene (LLDPE) and low density polyethylene (LDPE) having a combined thickness of 20μ; a first tie layer having a thickness of 12μ; a first ethylene vinyl alcohol (EVOH) polymer layer having a thickness of 5μ; a nylon 6 layer having a thickness of 5μ; a second ethylene vinyl alcohol (EVOH) polymer layer having a thickness of 5μ; a second tie layer having a thickness of 12μ; and a polyethylene layer of linear low density polyethylene (LLDPE) and low density polyethylene (LDPE) having a combined thickness of 20μ.

The structure of the above seven layered structure is depicted as:

20μ ((Linear low density polyethylene (LLDPE)+Low density polyethylene (LDPE))//12μ First Tie layer/5μ First ethylene vinyl alcohol (EVOH)/5μ Nylon 6//5μ Second ethylene vinyl alcohol (EVOH)//12μ Second Tie layer//20μ (Linear low density polyethylene (LLDPE)+Low density polyethylene (LDPE)).

In accordance with the present disclosure, the total thickness of ethylene vinyl alcohol (EVOH) polymer film layer is 70μ-90μ, preferably 79μ.

The laminate structure or the arrangement of the layers in the laminate structure, in accordance with the present disclosure, facilitates two types of printing in the partially opaque and partially clear laminate. The first printing is the selective metallization or printing in the substrate layer and the second printing is on the top polyethylene layer. The specific arrangement of the different layers in the laminate facilitates in obtaining a tube made of such laminate.

In accordance with the present disclosure, the term "opaque" refers to colored, printed, metallized or translucent portion of the laminate. The term "clear" refers to transparent, see-through, or limpid portion of the laminate.

In another embodiment, the inner polyethylene (PE) layer is a three layer film or a mono layer film.

In another aspect, an embodiment of the present disclosure provides a partially opaque and partially clear laminate comprising: an outer polyethylene (PE) layer having a thickness of 70μ-100μ; a first adhesive layer having a thickness of 5μ-7μ; a substrate layer with one side selectively vacuum metalized or selectively reverse printed and said printed or metalized side is toward said outer polyethylene layer having a thickness of 10μ-12μ; a second adhesive layer having a thickness of 5μ-7μ; an ethylene vinyl alcohol (EVOH) polymer barrier film layer having a thickness of 79μ-90μ; a low density polyethylene (LDPE) extrusion layer having a thickness of 20μ-65μ; and an inner polyethylene (PE) layer having a thickness of 70μ-120μ.

In a preferred embodiment, the partially opaque and partially clear laminate comprising: an outer polyethylene (PE) layer having a thickness of 70μ; a first adhesive layer having a thickness of 5μ-6μ; a substrate layer with one side selectively vacuum metalized or selectively reverse printed and said printed or metalized side is toward said outer polyethylene layer having a thickness of 10μ-12μ second adhesive layer having a thickness of 5μ-6μ; an ethylene vinyl alcohol (EVOH) polymer barrier film layer having a thickness of 79μ; a linear density polyethylene (LDPE) extrusion layer having a thickness of 20μ; and an inner polyethylene (PE) layer having a thickness of 100μ.

The laminate of the present disclosure can be of thickness in the range of 250μ to 400μ.

In one embodiment, the partially opaque and partially clear laminate, in accordance with the present disclosure, is used in manufacturing of laminate tube. In case of tube processes, extrusion lamination is preferably used.

The present disclosure further provides a process of manufacturing the laminate tube from said laminate comprising: providing the substrate layer; selectively gravure printing or vacuum metalized to the substrate layer using a suitable ink; applying adhesive lamination on both sides of the substrate layer; coating the substrate layer with ethylene vinyl alcohol (EVOH) barrier film; coating print side of the substrate layer with polyethylene (PE) film; extruding polyethylene (PE) film by extrusion lamination; coating the product facing side with polyethylene (PE) film; forming a partially opaque and a partially clear laminate; slitting rolls of partially opaque and a partially clear laminate by slitting process; printing of the rolls; and forming a partially opaque and a partially clear laminated tubes by tubing process.

The substrate layer used in the process above is selected from polyethylene terephthalate (PET) polymer, nylon, biaxially oriented film (BOPP), or Polyethylene (PE).

In an embodiment, the above process involves surface printing of the polyethylene (PE) film that forms the outer layer of the laminate.

In an embodiment, FIG. 1 provides an exemplary presentation of the partially opaque and partially clear laminate of the present disclosure. FIG. 1 shows a structure of partially opaque and partially clear laminate 100 in accordance to a preferred embodiment of the present disclosure. The partially opaque and clear laminate structure 100 comprises a layer of 70μ clear film in accordance to an aspect of the present disclosure. This acts as an outer print layer 102-1. The clear film layer 102-1 in a preferred embodiment is formed of polyethylene. In an aspect of the present disclosure, there can be more than one layer of polyethylene (PE), and most preferably three layers of polyethylene (PE) that acts as a clear film layer 102-1. A top adhesive layer 104-1 of 5 to 6 g/m² follows the clear film layer. The top adhesive layer 104-1 serves as the binding layer between the outer clear film layer 102-1 and the next layer underneath the top adhesive layer 104-1. Selected based on the composition of the outer layer and the next layer, the top adhesive layer can be a cold solvent based or solvent less adhesive or any ready made adhesive known in the state-of-the-art. The gravure print layer or vacuum metalized layer 106 is formed for about 10μ to 12μ beneath the top adhesive laminate layer 104-1. This substrate layer is formed of polyethylene terephthalate (PET), nylon, biaxially-oriented polypropylene (BOPP) or Polyethylene (PE) layer. Polyethylene terephthalate (PET) shows enhanced tear strength and elongation properties. In an alternative embodiment, this can be a clear or metallized biaxially-oriented polypropylene (BOPP) or a reverse printed nylon layer. The above process provides a 10μ to 12μ inner printed layer 106, which is an integral part of the laminate 100. This in addition to the 70μ outer clear film 102-1 that is available for surface printing provides an adhesive laminate with an outer and inner printing capability. Underneath the reverse printed polymer layer 106, a bottom adhesive layer 104-2 is provided for a similar thickness as that of the top adhesive layer 104-1, i.e. 5 to 6 g/m². The bottom adhesive layer 104-2 serves as the binding layer between the gravure print layer 106 and the next layer underneath the bottom adhesive layer 104-2.

In a preferred embodiment, underneath the bottom adhesive layer 104-2, the laminate 100 comprises 5 or 7 layers of barrier film 108 of 79μ thickness. The barrier layer 108 is also referred to as a core layer. The barrier layer 108 serves as a barrier to either air/oxygen or moisture or both. The barrier layer can be formed of aluminum or ethylene vinyl alcohol (EVOH). The aluminum barrier layer provides effective barrier properties against atmospheric gases, while the ethylene vinyl alcohol (EVOH) is employed to provide barrier against air as well as moisture and also exhibits good aroma-preservation property. In a preferred embodiment of the present disclosure, ethylene vinyl alcohol (EVOH) based barrier film 108 of 79μ thickness is employed. The use of ethylene vinyl alcohol (EVOH) based barrier film 108 makes the laminate 100 of the present subject matter a plastic barrier laminate (PBL).

The barrier film layer 108 is followed by a low density polyethylene (LDPE) extrusion layer 110, which in a preferred embodiment is of 20μ thickness. The low density polyethylene (LDPE) used in the present disclosure is advantageously of density around 0.918 g/cc to 0.935 g/cc, preferably 0.933 gm/cc and the density of the linear low density polyethylene (LLDPE) used is advantageously around 0.918 g/cc to 0.940 g/cc, preferably 0.927 gm/cc. Underneath the low density polyethylene (LDPE) layer 110, a clear film layer 102-2 of polyethylene (PE) that contacts the product is provided. In a preferred embodiment, three layers of clear film 102-2 of polyethylene (PE) can be advantageously provided, which is of 100μ thickness. The nature of this polyethylene (PE) layer 102-2 is such that, it acts as a product contact layer. Further it also acts as a sealant layer due to the efficient sealing characteristics of polyethylene (PE).

Figure 2:
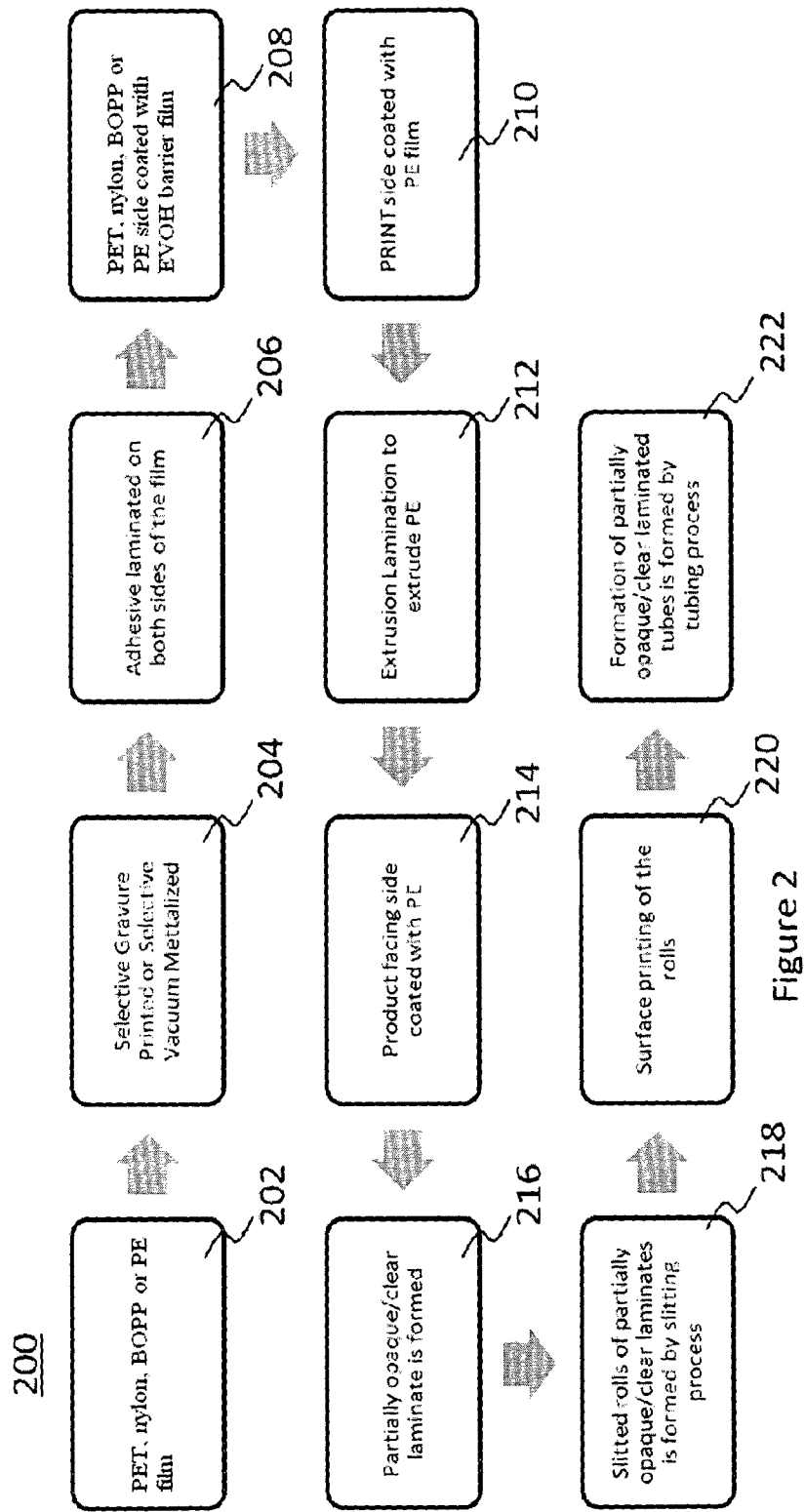
FIG. 2 illustrates a flow diagram of manufacturing process of a partially opaque and a partially clear tube, according to an embodiment of the present subject matter.

In an embodiment, FIG. 2 is an exemplary presentation of a manufacturing process 200 of a laminate tube by using the partially opaque and partially clear laminate of the present disclosure. The process 200 involves advantageously selecting 202 10μ to 12μ of polyethylene terephthalate (PET), biaxially oriented film (BOPP), Nylon film or Polyethylene (PE) in an aspect of the present disclosure. The selected 202 polyethylene terephthalate (PET) or biaxially oriented film (BOPP) film is gravure reverse printed or vacuum metalllized 204, which is advantageously engraved on its surface and an ink bath, which is a liquid ink of advantageous properties. The liquid ink is selectively metallized by adding glossy silver. The reverse printed or metallized substrate 204 that can be polyethylene terephthalate (PET), nylon or biaxially oriented film (BOPP) film is then adhesive laminated 206 on both sides. The above process 200 advantageously involves reverse printing or vacuum metallization 204 on polyethylene terephthalate (PET), nylon or biaxially oriented film (BOPP) film prior to adhesive lamination 206, which is not the case with the conventionally available techniques for making laminate tubes. The substrate side of the adhesive laminated film is coated 208 with a barrier film, preferably an ethylene vinyl alcohol (EVOH) based barrier film of 79μ, while the other side or the print side of the film is advantageously coated 210 with a 70μ layer of polyethylene (PE) clear film. Upon coating 208, 210 both sides of the film with the barrier film and clear film respectively, the polyethylene (PE) layer is now extruded 212 by normal extrusion lamination process, which is further laminated 214 with a 100μ polyethylene (PE) layer on the product contact side to advantageously form 216 a 280μ partially opaque and clear laminate. The extrusion lamination process 212 ensures that the heat resistant ink on the surface of the film is not removed. In an alternative embodiment, the partially opaque and clear laminate can be advantageously formed in a range of 200μ to 400μ. The partially opaque and clear continuous laminate thus formed 216 is slitted 218 into required length by passing through a blade that slits the laminate according to the size of the tube to be manufactured. Finally the laminate tubes are formed by a tubing process 222.

In a preferred embodiment, the above process involves surface printing 220 of the laminates thus formed. This is enabled by the gravure printing done on the reverse side of the laminate or the selective vacuum metallization process. Thus, the laminate 100 can be surface printed 220 and reverse printed 204 through its length. This provides the required opaque, colored, and clear effect on the plastic barrier laminate (PBL) tubes formed by the tubing step at the end of the manufacturing process.

There are various advantageous associated with the above described inner printing process. They are not subjected to color fading, scratches, and any other wear and tear that are associated with outer surface printing. The printing ink that is used in case of inner printing is different from that of the outer printing ink. Generally, in case of outer printing, solid inks are used. UV ink is most often used, as it does not require any solvent. However, in case of inner printing, liquid ink is used with a solvent. In a preferred embodiment, the solvent can be acetone, whose viscosity is as good as that of water. In an aspect of the present invention, the liquid ink comprises at least one binder, a solvent or a mixture of plurality of solvents, a plurality of colorants and additives. Further, the inner printing provides leverage for obtaining any desired pattern. This is mainly due to the reason that printing inside means that the laminate can still be printed outside during the regular laminate process. Therefore, one can achieve a number of combinations of patterns by this process. Moreover inner ink printing ensures that it can be further laminated and printed. This also ensures that the end portion of a tube laminate can be kept opaque.

The gravure printing process can also be surface printing in another aspect of the invention. The inner printing process provides variation of printed layers through the depth of a laminate. On the other hand, the gravure printing on the outer surface provides the alternate portions of white, color and opaque printed on the surface without variation in depth. Therefore, it is preferable to have the gravure print as part of laminate than as part of outer surface.

The gravure cylinder is etched in such a manner that it resists any sort of image breakdown during the rotation of the cylinder, especially in case of laminate of lesser thickness. Before printing, the gravure cylinders are heated in warm water and cleaned in order to remove any impurities from the surface of the cylinder. This process cures the presence of solvent on the surface of the cylinder. The clean cylinders are then chrome plated before the printing process. The gravure cylinder is then made to rotate by immersing on a liquid ink bath. On immersing, the channels on the surface of the gravure cylinder are filled with the liquid ink. An intermediately located doctor blade wipes off any surplus ink on the surface of the gravure cylinder. This ensures that the rotating gravure cylinder carries ink in its channels only. There is another roller called an impression roller that counteracts on the other side of the laminate that is passed, whose one side is in contact with the gravure cylinder. The impression cylinder enables proper transfer of ink into the gravure print layer of the laminate. The quantity of liquid ink carried through the channels of the gravure cylinder may depend on various factors including the selection of transparent, colored, and opaque surfaces on the tube laminate, the kind of polymer used in the gravure print layer of the laminate, the target application of the tube laminate being extruded and so on. The thickness or the depth of the channels in the gravure cylinder is proportional to the intensity of tone produced on the gravure print layer. This ensures that at areas where there is a need for a clear or transparent layer, the thickness of the channels can be selected to be minimum so that either no ink or less quantity of ink is carried through. Similarly, at areas within the laminate where there is a need for a colored or an opaque layer, the thickness of the channels can be selected to be maximum, so that stronger tone of ink is achieved on such areas. The adhesive lamination thus obtained is not dependent on temperature. This ensures that the ink is not removed during the process of lamination. In another aspect of the invention, selectively metallized PET can form a gravure print layer. In this case, the liquid ink used for inner printing on the gravure print layer is made of glossy silver inks, which gives the effect of metallization to the polyethylene terephthalate (PET) layer. This provides a glossy finish to the laminate tubes thus made.

EXAMPLES

The disclosure will now be illustrated with working examples, which is intended to illustrate the working of the disclosure and not intended to take restrictively to imply any limitations on the scope of the present disclosure. Other embodiments are also possible.

Example 1

An outer polyethylene (PE) layer is in contact with a first adhesive layer. The first adhesive layer binds to a substrate layer with one side selectively vacuum metalized or selectively reverse printed. The substrate layer is in contact with a second adhesive layer. The second adhesive layer is in contact with an ethylene vinyl alcohol (EVOH) polymer barrier film layer. The inner polyethylene (PE) layer is in contact with the above barrier layer.

Example 2

A three layered outer polyethylene (PE) layer of 48.0%-48.5% metallocene linear low density polyethylene (LLDPE); 48.0%-48.5% low density polyethylene (LDPE); and 3.0%-4.0% of a clarifier is in contact with a first adhesive layer. The first adhesive layer binds to a substrate layer with one side selectively vacuum metalized or selective reverse printed. The substrate layer is in contact with a second adhesive layer. The second adhesive layer is in contact with an ethylene vinyl alcohol (EVOH) polymer barrier film layer. The inner polyethylene (PE) layer is in contact with the above barrier layer.

Example 3

A partially opaque and a partially clear laminate is prepared in the same way as outlined in example 2, having the laminate structure:
A three layered outer polyethylene (PE) layer of 48.2% metallocene linear low density polyethylene (LLDPE); 48.3% low density polyethylene (LDPE); and 3.5% of a clarifier is in contact with a first adhesive layer//a substrate layer having a thickness of 11µ//an second adhesive layer having a thickness of 6µ//barrier film layer of ethylene vinyl alcohol (EVOH) having a thickness of 79µ//extrusion layer of linear low density polyethylene (LLDPE) having a thickness of 20µ//inner polyethylene (PE) layer having a thickness of 100µ.

Example 4

An outer polyethylene (PE) layer having a thickness in the range of 70µ-100µ is in contact with a first adhesive layer having a thickness in the range of 5µ-7µ. The first adhesive layer binds to a substrate layer with one side selectively vacuum metalized or selectively reverse printed having a thickness in the range of 10µ-12µ. The substrate layer is in contact with a second adhesive layer having a thickness in the range of 5µ-7µ. The second adhesive layer is in contact with a barrier layer of ethylene vinyl alcohol (EVOH) having a thickness in the range of 79µ-90µ. This barrier layer binds with a extrusion layer of linear low density polyethylene (LLDPE) having a thickness in the range of 20µ-65µ. The inner polyethylene (PE) layer having a thickness in the range of 70µ-120µ is in contact with the above extrusion layer.

Example 5

A partially opaque and a partially clear laminate is prepared in the same way as outlined in example 2, having the laminate structure:
An outer polyethylene (PE) layer having a thickness of 70µ//first adhesive layer having a thickness of 6µ//a substrate layer having a thickness of 11µ//an second adhesive layer having a thickness of 6µ//barrier film layer of ethylene vinyl alcohol (EVOH) having a thickness of 79µ//extrusion layer of linear low density polyethylene (LLDPE) having a thickness of 20µ//inner polyethylene (PE) layer having a thickness of 100µ.

Example 6

The five-layered ethylene vinyl alcohol (EVOH) film layer is prepared. The total thickness of the five-layered ethylene vinyl alcohol (EVOH) film layer is 70µ-90µ. A polyethylene layer of linear low density polyethylene (LLDPE) and low density polyethylene (LDPE) having a thickness in the range of 15µ-30µ is in contact with a first tie layer having a thickness in the range of 8µ-20µ which in turn is bound to an ethylene vinyl alcohol (EVOH) polymer layer having a thickness in the range of 5µ-25µ. A second tie layer having a thickness in the range of 8µ-20µ is in contact with the polymer layer. A polyethylene layer of linear low density polyethylene (LLDPE) and low density polyethylene (LDPE) having a thickness in the range of 10µ-30µ is in contact with the above second tie layer.

Example 7

The five-layered ethylene vinyl alcohol (EVOH) film layer is prepared in the same way as outlined in example 6, having the laminate structure:
20µ ((Linear low density polyethylene (LLDPE)+Low density polyethylene (LDPE))/12µ Tie layer/15µ Ethylene vinyl alcohol (EVOH)/12µ Tie layer/20µ ((Linear low density polyethylene (LLDPE)+Low density polyethylene (LDPE)).
The total thickness of the five-layered ethylene vinyl alcohol (EVOH) film layer is 79µ.

Example 8

The seven-layered ethylene vinyl alcohol (EVOH) film layer is prepared. The total thickness of the five-layered ethylene vinyl alcohol (EVOH) film layer is 70µ-90µ. A polyethylene layer of linear low density polyethylene (LLDPE) and low density polyethylene (LDPE) having a thickness in the range of 15µ-30µ is, in contact with a first tie layer having a thickness in the range of 8µ-20µ which in turn is bound to a first ethylene vinyl alcohol (EVOH) polymer layer having a thickness in the range of 4µ-6µ. The first ethylene vinyl alcohol (EVOH) polymer layer is in contact with a nylon 6 layer having a thickness in the range of 4µ-6µ.

This nylon 6 layer is bound to a second ethylene vinyl alcohol (EVOH) polymer layer having a thickness in the range of 4μ-6μ. The second ethylene vinyl alcohol (EVOH) polymer layer is in contact with a second tie layer having a thickness in the range of 8μ-20μ. A polyethylene layer of linear low density polyethylene (LLDPE) and low density polyethylene (LDPE) having a thickness in the range of 10μ-30μ is in contact with the above second tie layer.

Example 9

The seven-layered ethylene vinyl alcohol (EVOH) film layer is prepared in the same way as outlined in example 8, having the laminate structure:

20μ ((Linear low density polyethylene (LLDPE)+Low density polyethylene (LDPE))//12μ Tie layer//5μ Ethylene vinyl alcohol (EVOH)//5μ Nylon 6//5μ Ethylene vinyl alcohol (EVOH)//12μ Tie layer/20μ ((Linear low density polyethylene (LLDPE)+Low density polyethylene (LDPE)).

The total thickness of the five-layered ethylene vinyl alcohol (EVOH) film layer is 79μ.

The previously described versions of the subject matter and its equivalent thereof have many advantages, including those which are described below:
1. The present disclosure provides a partially opaque and a partially clear laminates of thickness of as high as 292μ that are partially opaque and partially clear.
2. The Plastic barrier tubes (PBL) tubes thus formed using the said laminate has various advantages like:
    I. For packing cosmetic products pharmaceutical ointments, skin creams, toothpastes, and food materials like sauces
    II. The Plastic barrier tubes (PBL) tubes come with enlarged printing benefits as they can be printed as many as 6 colors from outside surface printing.
    III. They act as good gas and moisture barriers apart from their aroma barrier characteristics that are essential for preserving the flavor of the contents.
    IV. They are made highly flexible due to the extrusion lamination process.
    V. They are also less susceptible to cracking.
    VI. These tubes possess good resilience, which eliminates the need for secondary packaging.
    VII. They are versatile in nature.

Although the subject matter has been described in considerable detail with reference to certain preferred embodiments thereof, other embodiments are possible. As such, the spirit and scope of the appended claims should not be limited to the description of the preferred embodiment contained therein.

We claim:
1. A laminate comprising:
   an outer polyethylene (PE) layer, wherein the outer polyethylene layer is a three layer film comprising: 48.0%-48.5% metallocene linear low density polyethylene (LLDPE); 48.0%-48.5% low density polyethylene (LDPE); and 3.0%-4.0% of a clarifier;
   a first adhesive layer;
   a substrate layer with one side selectively vacuum metalized or selectively reverse printed and said printed or metalized side faces toward the first adhesive layer;
   a second adhesive layer;
   an ethylene vinyl alcohol (EVOH) polymer barrier film layer;
   a low density polyethylene (LDPE) extrusion layer; and
   an inner polyethylene (PE) layer.

2. The laminate as claimed in claim 1, wherein the substrate layer is selected from polyethylene terephthalate polymer (PET), nylon, biaxially oriented film (BOPP) or Polyethylene (PE).

3. The laminate as claimed in claim 1, wherein the substrate layer is a polyethylene terephthalate polymer (PET) layer.

4. The laminate as claimed in claim 1, wherein said substrate layer is selectively printed or metalized to obtain a partially opaque and partially clear laminate.

5. The laminate as claimed in claim 1, wherein the ethylene vinyl alcohol (EVOH) polymer barrier film layer is a five or seven layered film layer.

6. The laminate as claimed in claim 5, wherein the five layered film layer comprises:
   a polyethylene layer of linear low density polyethylene (LLDPE) and low density polyethylene (LDPE) having a thickness of 20μ;
   a first tie layer having a thickness of 12μ;
   an ethylene vinyl alcohol (EVOH) polymer layer having a thickness of 15μ;
   a second tie layer having a thickness of 12μ; and
   a polyethylene layer of linear low density polyethylene (LLDPE) and low density polyethylene (LDPE) having a thickness of 20μ.

7. The laminate as claimed in claim 5, wherein the seven layered film layer comprises:
   a polyethylene layer of linear low density polyethylene (LLDPE) and low density polyethylene (LDPE) having a thickness of 20μ;
   a first tie layer having a thickness of 12μ;
   a first ethylene vinyl alcohol (EVOH) polymer layer having a thickness of 5μ;
   a nylon 6 layer having a thickness of 5μ;
   a second ethylene vinyl alcohol (EVOH) polymer layer having a thickness of 5μ;
   a second tie layer having a thickness of 12μ; and
   a polyethylene layer of linear low density polyethylene (LLDPE) and low density polyethylene (LDPE) having a thickness of 20μ.

8. The laminate as claimed in claim 1, wherein the total thickness of ethylene vinyl alcohol (EVOH) polymer film layer is 70μ-90μ.

9. The laminate as claimed in claim 1, wherein the inner polyethylene (PE) layer is a three layer film or a mono layer film.

10. The laminate as claimed in claim 1 comprising:
    the outer polyethylene (PE) layer having a thickness of 70μ-100μ;
    the first adhesive layer having a thickness of 5μ-7μ;
    the substrate layer having a thickness of 10μ-12μ;
    the second adhesive layer having a thickness of 5μ-7 p;
    the ethylene vinyl alcohol (EVOH) polymer barrier film layer having a thickness of 79μ-90μ;
    the linear density polyethylene (LDPE) extrusion layer having a thickness of 20μ-65μ; and
    the inner polyethylene (PE) layer having a thickness of 70μ-120μ.

11. The laminate as claimed in claim 1 comprising:
    the outer polyethylene (PE) layer having a thickness of 70μ;
    the first adhesive layer having a thickness of 6μ;
    the substrate layer having a thickness of 11μ;
    the second adhesive layer having a thickness of 6μ;
    the ethylene vinyl alcohol (EVOH) polymer barrier film layer having a thickness of 79μ;

the linear density polyethylene (LDPE) extrusion layer having a thickness of 20μ; and the inner polyethylene (PE) layer having a thickness of 100μ.

12. The laminate as claimed in claim 1, wherein the outer polyethylene (PE) film layer is surface printed.

* * * * *